United States Patent Office 2,851,744
Patented Sept. 16, 1958

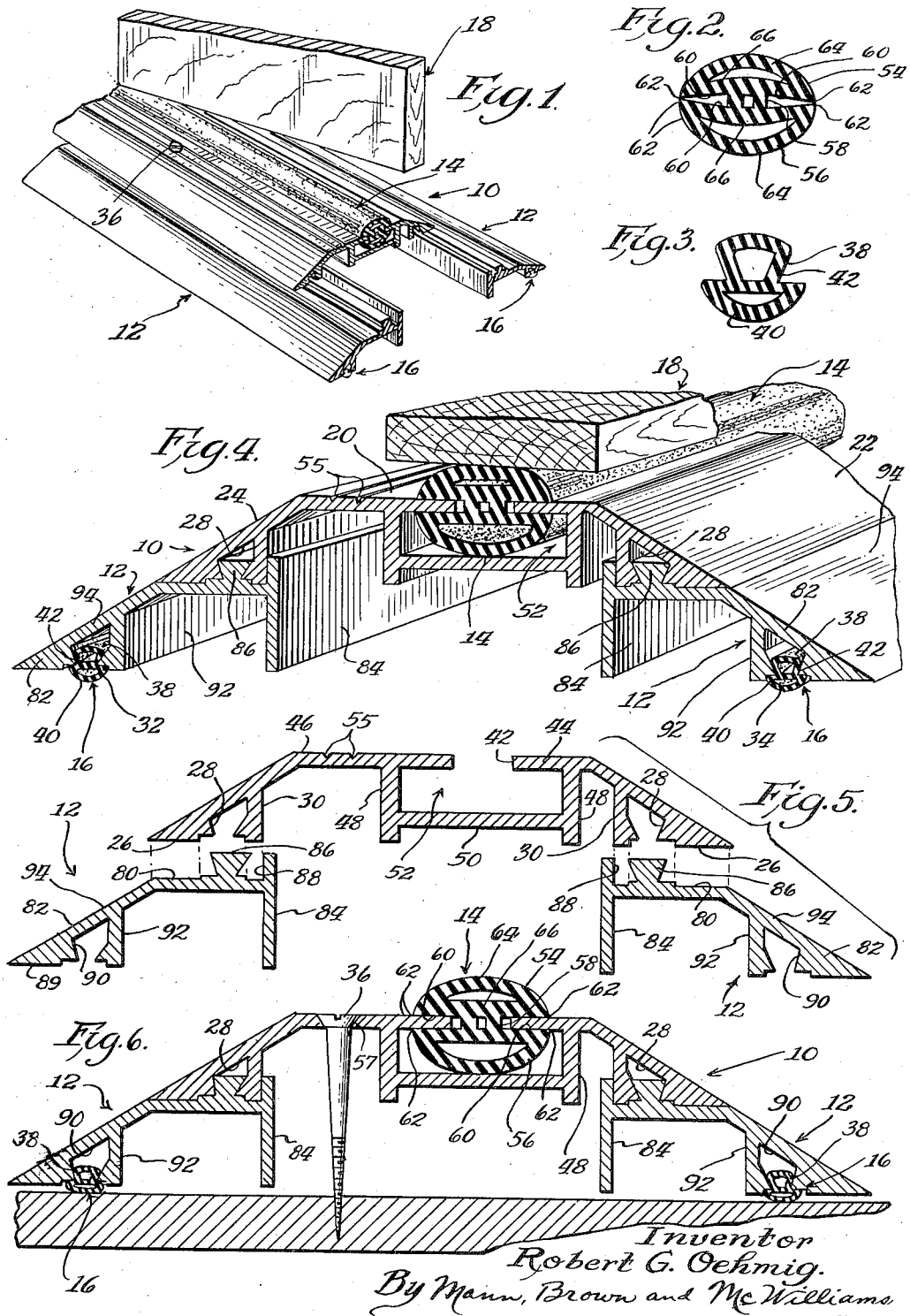

2,851,744
WEATHERSTRIPPED THRESHOLD AND RISER THEREFOR

Robert G. Oehmig, Chicago, Ill.

Application December 7, 1955, Serial No. 551,610

2 Claims. (Cl. 20—64)

My invention relates to a weatherstripped threshold and riser therefor, including resilient weather sealing means for sealing engagement with the lower edge of the door. The weatherstripped threshold is disclosed in my copending application Serial Number 510,675, filed May 24, 1955, of which this application is a continuation-in-part.

My said copending application discloses a threshold comprising an upper, generally level tread plate including downwardly inclined side portions or flanges which rest on the floor to support the tread plate. The tread plate is formed with a longitudinal slot, and is thereby sectionalized, it being held in rigid relation by a normally concealed connecting wall or web. A novel form of weatherstripping is mounted in the slot, the weatherstripping comprising a pair of tubular sealing members or elements integrally united by a web; the web of the weatherstripping is received between the edges of the tread plate defining the slot with the tubular sealing members or elements being positioned above and below the tread plate, the upper sealing member being positioned for sealing engagement with the bottom edge of the door in its closed position. The sealing members are generaly semi-elliptical in configuration, with the flat inner surfaces of each resiliently engaging the adjacent faces of the tread plate. The edges of the sealing members lie snugly against the tread plate so that when either sealing member is positioned above the tread plate, entry of dirt or water beneath the weatherstrip is prevented. The weatherstripping is reversible, and when one sealing element thereof wears out, the weatherstripping may be withdrawn, reversed, and reapplied to the tread plate with the unused sealing member positioned above the threshold tread plate for contact with the door.

One of the main problems in weatherstripping doors is the lower door clearances are never uniform and the thresholds supplied frequently do not properly fill the space between the lower edge of the door and the floor above which the door is mounted. Conventional thresholds may be adjusted only be reducing their vertical height, which detracts from the strength of the door, or by inserting props under the threshold, which frequently leaves cracks or openings that hard to seal and renders the threshold a dangerous obstruction.

A principal object of the invention is to provide an improved threshold including a novel weatherstripping element mounted for engagement with the lower edge of the door.

Another object of my invention is to provide an adapter or riser for thresholds that properly adjusts the threshold with respect to the lower edge of the door.

A further object of the invention is to provide a weatherstripped threshold and riser therefor that adapts the threshold for application to a wide variety of door weatherstripping problems.

Still a further object of the invention is to provide a threshold riser that is particularly adapted for application to the threshold disclosed in my said copending application.

Still another object of the invention is to provide a threshold riser that extends the threshold approaches so that a dangerous foot catching obstruction is avoided even though the top of the threshold is positioned a substantial distance above the floor level.

Other objects, uses and advantages will be obvious or become apparent from a consideration of the following description and drawing.

In the drawing:

Figure 1 is a perspective view showing my threshold and riser therefor in position under a door, with parts broken away;

Figure 2 is a sectional view through one of the weatherstripping elements;

Figure 3 is a sectional view through another of the weatherstripping elements;

Figure 4 is a perspective view from a different angle, partially in section and on an enlarged scale, showing the door in closed position.

Figure 5 is a vertical sectional view of the threshold and riser elements, with the weatherstripping omitted and showing the threshold displaced from the riser elements; and Figure 6 is a vertical sectional view of the threshold, riser elements and weatherstripping mounted for use under a door.

Reference numeral 10 generally indicates my improved threshold including the riser elements or plates 12 and the two-lobe weatherstripping 14 and 16, mounted under a conventional swinging door 18.

As disclosed in my said copending application, the threshold comprises an upper tread plate 20 having downwardly sloping inner and outer side portions, approaches, or flanges 22 and 24 secured to the edge thereof which rest on the floor to support the tread plate. The downwardly facing surfaces 26 of the side portions are formed with a dovetail groove 28 that defines a downwardly extending leg 30 which aids in supporting the threshold tread plate. The grooves 28 each receive identical cushioning and sealing strips 32 and 34 that are formed from a resilient material such as vinyl plastic and when the threshold 10 is secured to the floor, without the riser plates means, these strips 32 and 34 afford a weather seal between the floor and the flanges or side portions 22 and 24.

The strips 32 and 34 generally comprise a pair of tubular rod-like elements 38 and 40 integrally united as at 42. Preferably the element from which strips 32 and 34 are cut is extruded in the form of the illustrated integrally united strip by any conventional extruding process. The lower elements 40 are generally semi-elliptical in configuration, while the upper elements 38 are formed with inclined sides adapted to engage the correspondingly inclined sides of the respective dovetail grooves 28. When the riser elements herein disclosed are not used, the strips 32 and 34 are inserted into the respective grooves 28 and the threshold secured to the floor in any suitable manner with the strips 32 and 34 in contact therewith.

The tread plate 20 is formed with a longitudinal slot 42 and is thus sectionalized into inner portion 44 and outer portion 46 that in effect define the slot 42. The inner and outer portions of the tread plate are held in rigid relation by a normally concealed connection provided between and beneath the portions 44 and 46 of the tread plate. Thus, the inner and outer portions of the tread plate each include a leg 48, which legs are connected near their lower ends by an integral horizontal wall 50. The legs 48 and the wall 50 thus connect and rigidly relate the tread plate portions or sections, and cooperate to define a relatively deep and wide clearance passage 52 that is laterally centered on the slot 42. The upper side of the space or passage 52 is defined by the overhanging ledge portions of the tread plate sections or portions 44 and 46, and hence the passage 52 and the slot 42, when considered together, may be said to be an undercut groove or inverted T-slot.

As described in said copending application, the weatherstrip 14 has unique characteristics of form which enable it to cooperate in a novel and advantageous manner with the novel threshold illustrated, and by reason of such novel cooperation, ready adaption of the threshold structure for difference in clearances may be accomplished, trapping and accumulation of dust and dirt is avoided, and inadvertent removal or displacement of the weatherstrip 11 is prevented.

The weatherstrip 14 generally comprises a pair of semielliptical tubular rod like sealing elements 54 and 56 integrally united by a web or flange 58. The web or flange 58 of the illustrated embodiment is hollow to conserve material and make the strip 14 more readily bendable in handling and packing. The sealing elements 54 and 56 are outwardly convex in form and have generally flat opposed surfaces 60 to which the web or flange 58 is joined substantially midway between the edges 62 of such flat surfaces, and in the illustrated embodiment, the sealing elements 54 and 56 are hollow. The hollow form of elements 54 and 56 is defined by the convex wall 64 thereof and the generally flat wall 66 thereof, which meet in an acute angular relation to form sharp opposite edges 62 that will bear snugly against the flat upper faces of the tread plate sections or portions 44 and 46.

The web or flange 58 of the weatherstrip 14 is but slightly narrower than the slot 42, and since the sealing elements 54 and 56 are relatively wide, the spaces afforded on opposite sides of the web or flange 58 and between the walls 66 are relatively deep as measured from the edges 62 of the sealing elements to this web 58. The weatherstrip 14 may thus be associated with the threshold 10 by inserting the web 58 endwise into the slot 42 with one sealing element located within the passage 52 and the other sealing element overlying the tread plate sections or portions 44 and 46. The weatherstrip 14 may, of course, be inserted in either of its relationships, and in those instances where the sealing members 54 and 56 are of the same size, this capability may be utilized when the upper or outer sealing member 54 becomes worn due to prolonged use. As illustrated, however, the sealing element 56 is made so as to be somewhat larger or thicker than the sealing member 54, and this is done so that the workman, by reversal of the weatherstrip 14, may install the threshold so as to conform with different clearances that may be encountered under the door. When the weatherstrip 14 is thus installed, the upper one of the sealing elements serves as the weather sealing means, while the other of such members serves as the retaining means to hold the weatherstrip in position.

As pointed out above, the flat lower surface of the uppermost sealing element 54 fits flat against the flat upper face of the tread plate 20, and presents sharp edges that lie snugly against the tread plate so as to prevent entry of dirt or water beneath the weatherstrip. The normal forces applied downwardly to the edge of the sealing strip 14 when the door compresses the strip serve to promote this sealing action, and, in addition, the strip is initially formed so that the opposed edges of the flat walls, in the unstressed condition (see Figure 2) are normally in substantial contact. Thus, when the strip 14 is put in place, the sharp edges of the sealing members are resiliently urged into engagement with the tread plate. This permits its normal sweeping and cleaning operations to be performed adjacent the door without danger of forcing dirt or water underneath the strip 14.

It is important to note that the clearance passage 52 of the undercut groove is relatively wide and deep, and thus provides sufficient clearance space for reception of either of the sealing strips 54 or 56 of the reversible weatherstrip 14. The wall 50 and legs 48 that cooperate with the overhanging ledge portions of the tread plate sections in providing the housing clearance passage 52 serve also to rigidly connect the tread plate sections, and also to function as leg means for supporting the adjacent edges of the tread plate sections firmly in the desired position, and although the wall 50 and legs 48 are herein shown as being straight in form and rectangularly related, it is to be recognized that other forms and relations might be employed so long as the aforesaid housing, connecting and supporting functions are attained.

The slot 42 is preferably positioned to one side of the central axis of the threshold and the relatively longer level surface is formed with a pair of spaced apart grooves 55 between which holes 57 may be formed by the installer to receive screws 36. The main body of the threshold 10 is normally mounted under the door 18 with the stripping 14 applied thereto that normally fills the clearance between the door and the threshold. However, where the clearance is such that the threshold and strips 14 and 16 are not of sufficient vertical thickness to fill the clearance between the lower edge of the door and the floor, riser elements 12 may be employed.

As shown more particularly in Figure 5, the riser elements or plates 12 each generally comprise a horizontal wall or top portion 80 having a downwardly inclined side or approach portion or flange 82 integral with one edge thereof and a substantially vertical wall 84 integral with the other edge thereof. The wall or top portion 80 is formed with a dovetail ridge 86 that is formed to slidably fit into the respective grooves 28 in place of the weatherstripping 32 and 34, and which defines with the wall 84 a groove 88 in which the legs 30 are received. The undersurface 89 of each riser element is formed with a groove 90 shaped similarly to the grooves 28 and defining legs 92 similar to legs 30. The inclined surface 94 of the riser elements is formed to provide an extension or continuation of the inclined side portions, approaches, or flanges of the main body of the threshold.

When a particular installation requires risers 12, they are applied to the threshold 10 with the ridges thereof being received in the respective grooves 28 in place of the stripping 32 and 34. The risers are preferably cut sufficiently long to extend the entire length of the threshold. The strippings 32 and 34 are applied to the grooves 90 as shown in Figure 4 for contact with the floor when the threshold and riser elements are secured in place by screws or any other suitable means.

The threshold 10 and the riser elements 12 are preferably sections of extruded material such as aluminum or the like cut to appropriate lengths. The riser elements for both sides of the threshold may be cut from the same length of extruded material. The threshold 10 and riser elements 12 may be provided in strip form, with the riser elements being provided in different thicknesses, so that those concerned with installing thresholds may complete the job without making extra trips to secure materials for mounting the threshold to suit conditions. The weatherstripping 14 and 16 may also be supplied in strips or lengths that may be cut to size as needed. The grooves 55 provide a ready means of defining the desired location of holes 57 transversely of the threshold.

It will thus be seen that my invention provides a threshold having resilient weatherstripping which prevents dirt and water from collecting along or under the edges thereof and which provides a neat and attractive appearance. It will also be evident that the weatherstripped threshold of the present invention may be quickly and easily adapted for effective use with doors having varying clearances, and the weatherstrip is so related to the threshold that it cannot be inadvertently displaced from its operative position. Moreover, the riser elements permit easy adjustment of the threshold to suit conditions, and these elements and the main threshold body are formed with interengaging locking means that securely attach the risers to the threshold.

The foregoing description and the drawing are given merely to explain and illustrate my invention, and the invention is not to be limited thereto, except insofar as the appended claims are so limited since those skilled in the art who have my disclosure before them will be able to make modifications and variations therein without departing from the scope of the invention.

I claim:

1. In a one-piece threshold including an upper generally horizontal tread plate having downwardly inclined approach portions along the longitudinally extending edges thereof, and an open ended dovetail groove formed in the undersurface of each of said portions for receiving one portion of a two-lobe weatherstripping, the improvement wherein a riser element is mounted under each approach portion of the threshold, said riser elements each being formed with a ridge that is complementary to the groove of the approach portion under which the riser element is received, said ridges of said riser elements being received in the grooves of the respective approach portions, said riser elements each including an approach portion that is complementary to and forms an extension of the respective tread plate approach portions, said riser elements each being formed with a longitudinally extending dovetail groove that corresponds in configuration to the respective grooves of said tread plate approach portions and is adapted to receive weatherstrippings similar to the first mentioned weatherstrippings of said tread plate.

2. In a threshold including a generally horizontal tread plate having a downwardly inclined approach portion along one longitudinally extending edge thereof that has formed in its under surface an open ended dovetail groove for receiving one portion of a two-lobe weatherstripping, a riser element therefor comprising a generally horizontal portion formed with a ridge that is generally complementary to the groove of the approach portion of the tread plate and is adapted to be received in the groove in place of the weatherstripping, with the remainder of the under surface of said approach portion bearing against said horizontal portion of said riser element, said riser element including a downwardly inclined approach portion that is complementary to and merges with the approach portion of said tread plate when said ridge of said riser element is received in the groove of said tread plate, said approach portion of said riser element being formed in its under surface with a longitudinally extending dovetail groove that corresponds in configuration to the groove of said tread plate, and is thereby adapted to receive the two-lobe weatherstripping.

References Cited in the file of this patent

UNITED STATES PATENTS

| | | |
|---|---|---|
| 100,461 | St. Clair | Mar. 1, 1870 |
| 1,593,540 | Parsons | July 20, 1926 |
| 1,840,879 | Barringer | Jan. 12, 1932 |
| 1,890,672 | Coco | Dec. 13, 1932 |
| 1,936,641 | Plym | Nov. 28, 1933 |
| 1,998,791 | Schanz | Apr. 23, 1935 |
| 2,108,137 | Oftedal et al. | Feb. 15, 1938 |
| 2,181,812 | Kammerer | Nov. 28, 1939 |
| 2,702,415 | Wagner | Feb. 22, 1955 |
| 2,718,677 | Cornell | Sept. 27, 1955 |
| 2,739,357 | Seabrook | Mar. 27, 1956 |